United States Patent
Higuchi

(10) Patent No.: US 7,593,800 B2
(45) Date of Patent: Sep. 22, 2009

(54) TURNING CONTROL APPARATUS AND METHOD FOR AUTOMOTIVE VEHICLE

(75) Inventor: Takuya Higuchi, Tokyo (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 683 days.

(21) Appl. No.: 10/982,884

(22) Filed: Nov. 8, 2004

(65) Prior Publication Data

US 2005/0107940 A1    May 19, 2005

(30) Foreign Application Priority Data

Nov. 13, 2003    (JP) .............................. 2003-384194

(51) Int. Cl.
G06N 7/04 (2006.01)
(52) U.S. Cl. .............................. 701/70; 701/72; 701/78; 180/168; 303/146
(58) Field of Classification Search .................. 701/70, 701/78, 72, 208, 210, 211; 180/168; 303/146
See application file for complete search history.

(56) References Cited

U.S. PATENT DOCUMENTS

| | | | |
|---|---|---|---|
| 5,924,508 A | 7/1999 | Clauss et al. | |
| 6,076,034 A * | 6/2000 | Satoh et al. | 701/70 |
| 6,081,761 A * | 6/2000 | Harada et al. | 701/72 |
| 6,272,416 B1 | 8/2001 | Kuroda et al. | |
| 6,397,140 B2 * | 5/2002 | Minowa et al. | 701/96 |
| 6,554,089 B2 * | 4/2003 | Sato et al. | 180/169 |
| 6,778,896 B1 * | 8/2004 | Matsuura et al. | 701/70 |
| 6,954,140 B2 * | 10/2005 | Holler | 340/438 |
| 7,392,127 B2 * | 6/2008 | Kato et al. | 701/70 |
| 2001/0005101 A1 * | 6/2001 | Matsuno | 303/146 |
| 2002/0101116 A1 * | 8/2002 | Kostadina | 303/146 |
| 2003/0011241 A1 * | 1/2003 | Batistic et al. | 303/146 |
| 2004/0080209 A1 * | 4/2004 | Leimbach et al. | 303/146 |

FOREIGN PATENT DOCUMENTS

| | | |
|---|---|---|
| JP | 5-16699 A | 1/1993 |
| JP | 2600876 B2 | 1/1997 |
| JP | 10-157585 A | 6/1998 |
| JP | 11-020511 A | 1/1999 |
| JP | 2002-127888 A | 5/2000 |

* cited by examiner

*Primary Examiner*—Khoi Tran
*Assistant Examiner*—Nikhil Sriraman
(74) *Attorney, Agent, or Firm*—Foley & Lardner LLP

(57) ABSTRACT

In a turning control apparatus and method for an automotive vehicle, a turning controller places a limitation on an automatic deceleration of the vehicle which is started when a turning state of the vehicle exceeds a predetermined deceleration-start threshold value that has a margin for a limit value of turning performance of the vehicle, in such a manner that the turning state of the vehicle approaches to the limit of turning performance of the vehicle in accordance with an accelerator manipulation by a driver. In the case where the driver erroneously manipulates an accelerator pedal, the limitation on the automatic deceleration is suspended.

18 Claims, 7 Drawing Sheets

007# TURNING CONTROL APPARATUS AND METHOD FOR AUTOMOTIVE VEHICLE

BACKGROUND OF THE INVENTION a) Field of the Invention

The present invention relates to turning (or cornering) control apparatus and method for an automotive vehicle, in which an automatic deceleration (or, an automatic decrease of a vehicular velocity) according to a turning state of the automotive vehicle is performed in order to secure a stable turning.

b) Description of the Related Art

A grip force of any one or more of road wheels is already saturated when a turning (or cornering) velocity of the automotive vehicle or a turning radius thereof reaches to a limit of turning performance within which a stable turning can be achieved (i.e., within which a vehicle can travel with stability). The automatic deceleration in this state causes a behavior of the automotive vehicle to be worsened. With this fact taken into consideration, a Japanese Patent No. 2600876 issued on Jan. 29, 1997 exemplifies a previously proposed turning control apparatus in which the automatic deceleration is performed according to the turning state of the automotive vehicle. The above-described Japanese Patent teaches that a velocity of the vehicle is decreased before the turning velocity of the vehicle reaches to a marginal (or limit) velocity for the stable turning by setting a threshold value of the turning velocity at which the automatic deceleration is started to be a value smaller than the marginal turning velocity that is the limit value of turning performance of the vehicle.

Moreover, the vehicle driver sometime demands an acceleration of the vehicle (or, demands an increase of the vehicular velocity) depending on a driving skill of the driver or a driving situation even while performing the automatic deceleration. A Japanese Patent Application First Publication No. 2002-127888 published on May 9, 2002 exemplifies another previously proposed turning control apparatus. The above-described Japanese Patent Application First Publication teaches that the automatic deceleration is stopped and the vehicle is accelerated when determining that the driver wants to accelerate the vehicle from an accelerator manipulation by the driver.

SUMMARY OF THE INVENTION

In the former previously proposed turning control apparatus disclosed in the above-described Japanese Patent No. 2600876, since the automatic deceleration is started before the turning velocity of the vehicle reaches to the marginal (or limit) velocity for the stable turning, the vehicle cannot be accelerated any more even if the driver manipulates (or depresses) an accelerator of the vehicle in order for the (turning) velocity of the vehicle to become close to the limit of turning performance.

On the other hand, in the latter previously proposed turning control apparatus disclosed in the above-described Japanese Patent Application First Publication No. 2002-127888, since the automatic deceleration is stopped according to the accelerator manipulation by the driver, the automatic deceleration is stopped even when the driver manipulates an accelerator of the vehicle erroneously. Hence, there is a possibility that the turning velocity of the vehicle exceeds the limit of turning performance of the vehicle.

It is, therefore, an object of the present invention to provide turning control apparatus and method for the automotive vehicle which are capable of approaching the turning state of the vehicle to the limit of turning performance of the vehicle according to the accelerator manipulation by the driver.

According to one aspect of the present invention, there is provided a turning control apparatus for an automotive vehicle, comprising: a turning control section that controllably decelerates the vehicle in accordance with a turning state of the vehicle when the turning state of the vehicle exceeds a predetermined deceleration-start threshold value which has a margin against a limit of a turning performance of the vehicle; and an accelerator manipulated variable detecting section that detects an accelerator manipulated variable, the turning control section placing a limitation on a deceleration of the vehicle to approach the turning state of the vehicle to the limit of the turning performance in dependence upon a magnitude of the detected accelerator manipulated variable when the turning state of the vehicle exceeds the predetermined deceleration-start threshold value.

According to another aspect of the invention, there is provided a turning control method for an automotive vehicle, comprising: decelerating the vehicle controllably in accordance with a turning state of the vehicle when the turning state of the vehicle exceeds a predetermined deceleration-start threshold value which has a margin against a limit of a turning performance of the vehicle; detecting an accelerator manipulated variable; and placing a limitation on a deceleration of the vehicle to approach the turning state of the vehicle to the limit of the turning performance in dependence upon a magnitude of the detected accelerator manipulated variable when the turning state of the vehicle exceeds the predetermined deceleration-start threshold value.

The disclosure of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

Figure 1:
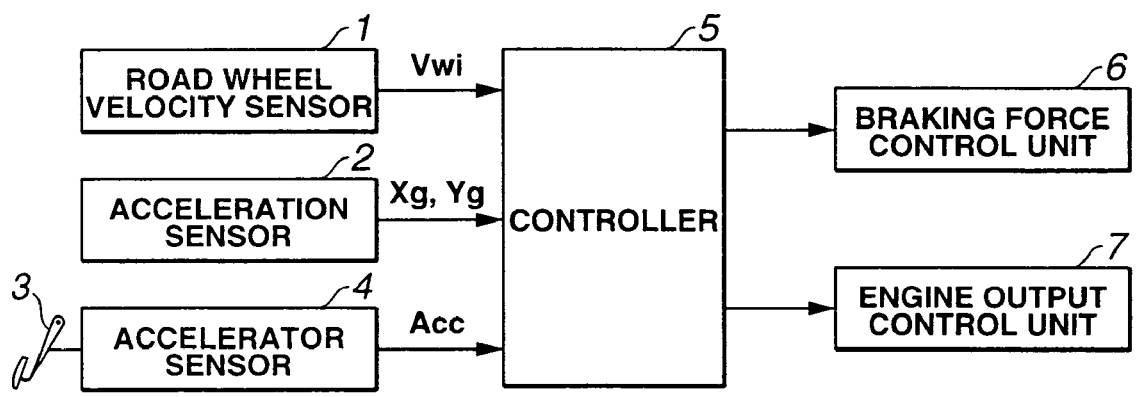
FIG. 1 is a schematic block diagram representing a configuration of a turning control apparatus in a first preferred embodiment according to the present invention.

FIG. 1 shows a schematic block diagram representing a configuration of a turning control apparatus according to the present invention. A road wheel velocity sensor 1 using electromagnetic induction to detect a road wheel velocity Vwi (i=FL, FR, RL, and RR (i.e., front left, front right, rear left, and rear right)) of each road wheel, an acceleration sensor 2 to detect a longitudinal acceleration Xg of a vehicle body and a lateral acceleration Yg thereof using, for example, a mercury switch, and an accelerator sensor 4 to detect an accelerator opening angle Acc of an accelerator pedal 3 are connected to a controller 5. This controller 5 is constituted by, for example, a microcomputer and performs a turning control processing as will be described later on the basis of various signals inputted from the respective sensors. Controller 5 controls a braking force control unit 6 and an engine output control unit 7 in order to perform the automatic deceleration in accordance with the turning (or cornering) state of the automotive vehicle.

Figure 2:
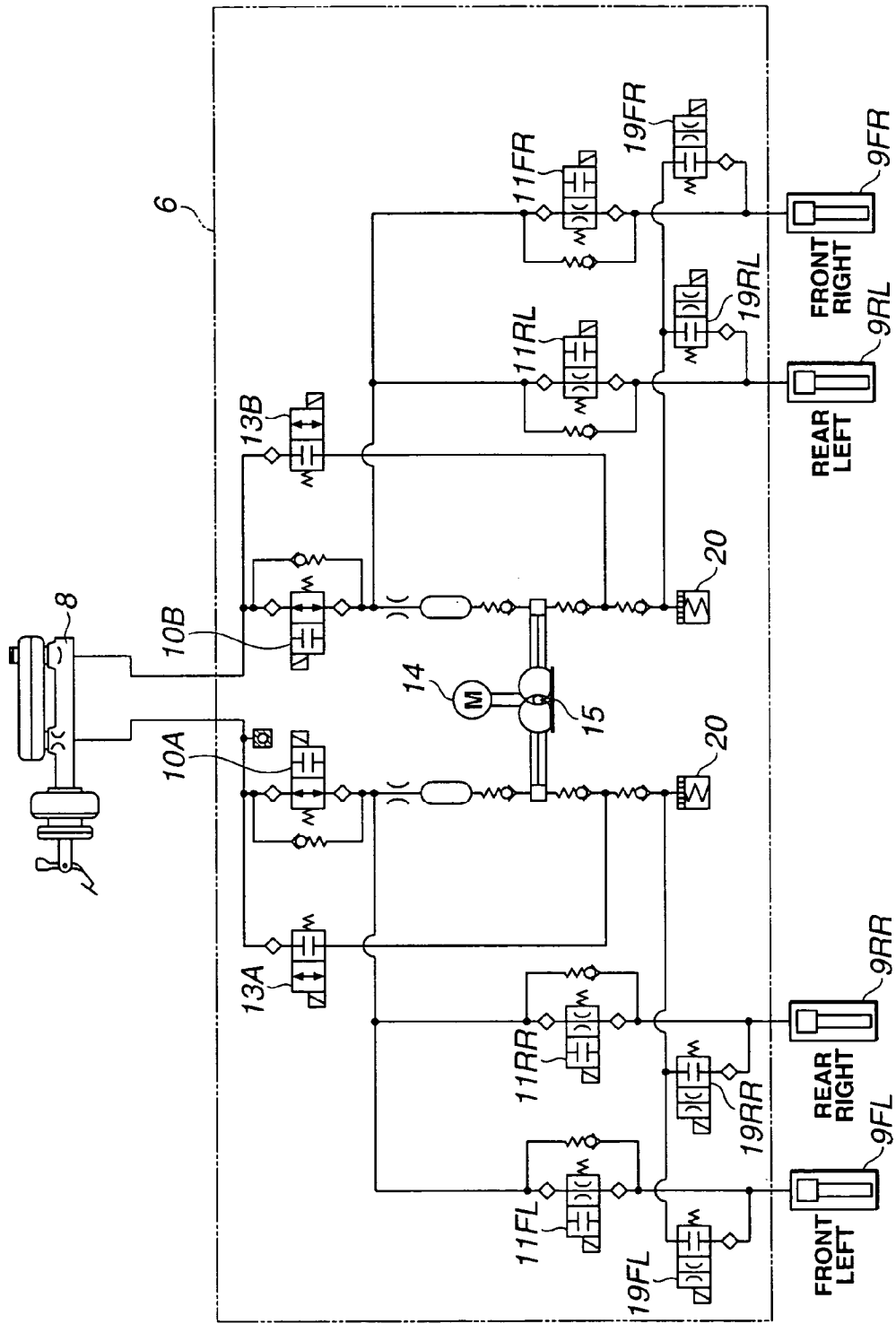
FIG. 2 is a hydraulic circuit diagram of a braking force control unit.

Braking force control unit 6 is constituted by a braking liquid pressure control circuit used for, for example, an antilock brake system (ABS), traction control system (TCS), or a vehicular dynamic controller (VDC). As shown in FIG. 2, braking force control unit 6 is interposed between a master cylinder 8 and each wheel cylinder 9i (i=FL, FR, RL, and RR) and can increase, hold, and decrease, a braking liquid pressure of each wheel cylinder 9i irrespective of a brake manipulation (or actuation) by the driver.

Master cylinder 8 is connected to each wheel cylinder 9i through normally-open switching valves 10A and 10B and each normally-open inlet solenoid valve 11i (i=FL, FR, RL, and RR). Master cylinder 8 is also connected to a suction side of a pump 15 through normally-close switching valves 13A and 13B. This pump 15 is driven by an electric motor 14.

Moreover, each wheel cylinder 9i is connected to the suction side of pump 15 through a normally-close outlet solenoid valve 19i (i=FL, FR, RL, or RR) and a reservoir 20. Therefore, in braking force control unit 6, an ordinary braking liquid pressure in accordance with the brake manipulation by the driver is supplied to each wheel cylinder 9i (i=FL, FR, RL, and RR) through switching valves 10A and 10B and corresponding inlet solenoid valve 11i (i=FL, FR, RL, or RR) when all of switching valves 10A and 10B, switching valves 13A and 13B, each inlet solenoid valve 11i (i=FL, FR, RL, and RR), and each outlet solenoid valve 19i (i=FL, FR, RL, and RR) are turned off (namely, are not energized).

The working liquid pressure is sucked from master cylinder 8 to pump 15 through switching valves 13A and 13B and is supplied from pump 15 to each wheel cylinder 9i through each inlet solenoid valve 11i irrespective of the brake manipulation by the driver when all of switching valves 10A and 10B and switching valves 13A and 13B are energized (namely, turned on) and pump 15 is activated. Hence, the working liquid pressure of each wheel cylinder 9i is increased. On the other hand, while a power of each inlet solenoid valve 11FL through 11RR is turned on, the working liquid pressure of corresponding wheel cylinder 9FL through 9RR is retained. Furthermore, the braking liquid pressure of each wheel cylinder 9FL through 9RR is drained to reservoir 20 and is decreased when all of corresponding inlet solenoid valve 11FL through 11RR and corresponding outlet solenoid valve 19FL through 19RR are turned on.

Therefore, controller 5 can increase, hold, and decrease the braking liquid pressure of each wheel-cylinder 9i by controlling a power supply turn on-and-off of the above-described switching valves 10A and 10B, switching valves 13A and 13B, inlet solenoid valves 11i, and outlet solenoid valves 19i, respectively, and by carrying out a driving control for pump 15. In FIG. 1, engine output control unit 7 controls an engine output by adjusting, for example, an opening angle of a throttle valve.

Next, a turning control processing executed by controller 5 of the turning control apparatus in the first preferred embodiment according to the present invention will be described with reference to a flowchart of FIG. 3.

Figure 3:
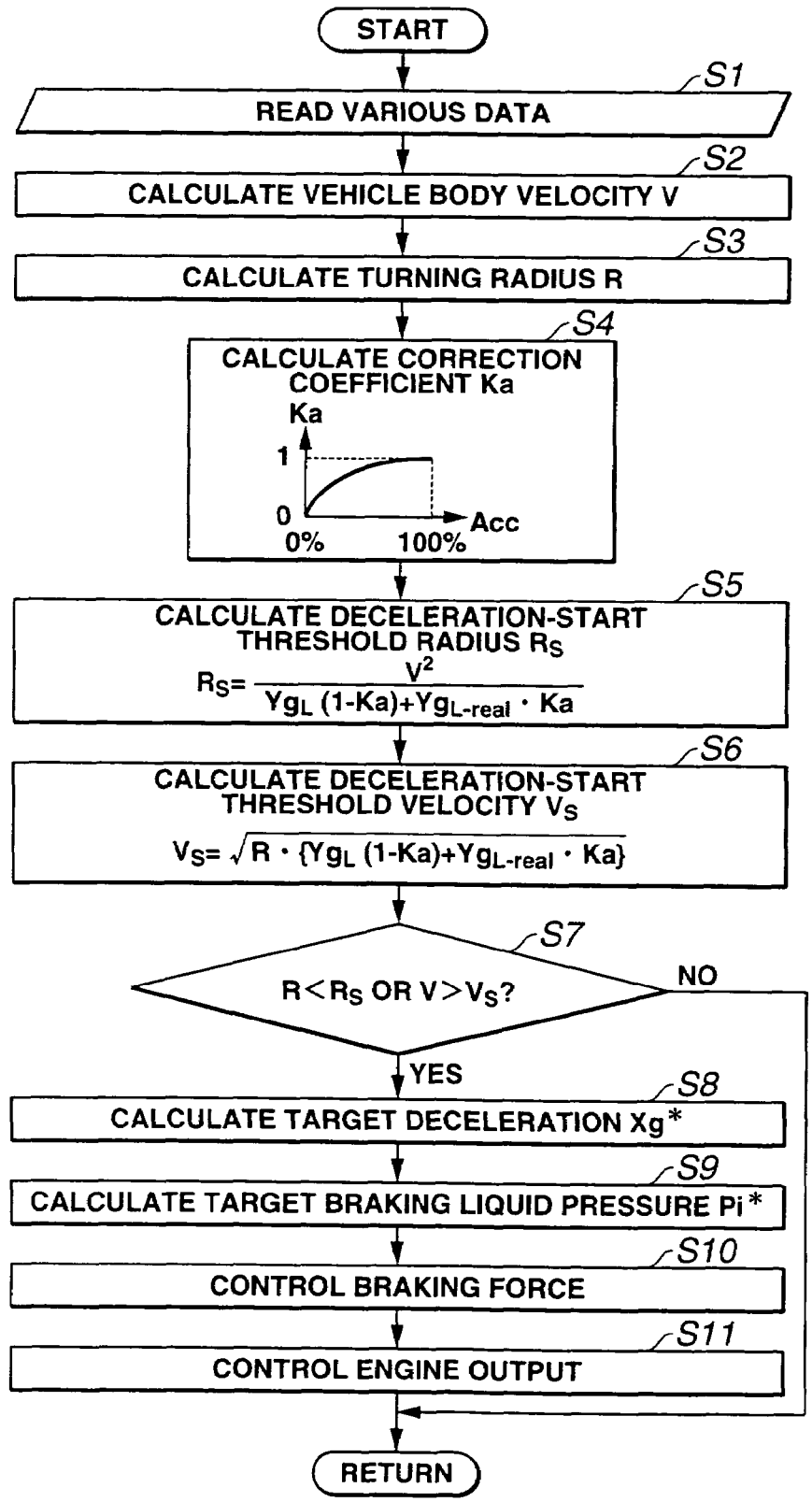
FIG. 3 is an operational flowchart representing a processing of a turning control executed in the first preferred embodiment of the turning control apparatus according to the present invention.

The turning control processing shown in FIG. 3 is executed as a timer interrupt routine for each of predetermined intervals, for example, for each of ten milliseconds. At a step S1 in FIG. 3, controller 5 reads each road wheel velocity Vwi (i=FL, FR, RL, and RR) of the four road wheels, longitudinal acceleration Xg of a vehicle body and lateral acceleration Yg thereof, and accelerator opening angle Acc.

At a step S2, controller 5 calculates a vehicle body velocity V on the basis of each road wheel velocity Vwi and longitudinal acceleration Xg.

At the next step S3, controller 5 calculates a present turning radius R of the vehicle in accordance with the following equation (1) on the basis of vehicle body velocity (hereinafter, also called a turning velocity) V and lateral acceleration Yg. Although turning radius R is merely calculated on the basis of turning velocity V and lateral acceleration Yg in this embodiment, a calculation method of turning radius R is not limited to this. Turning radius R may be calculated by adding, for example, a steering angle θ or a yaw angular acceleration for an improvement in a measurement accuracy.

$$R = V^2/Yg \qquad (1).$$

Figure 4:
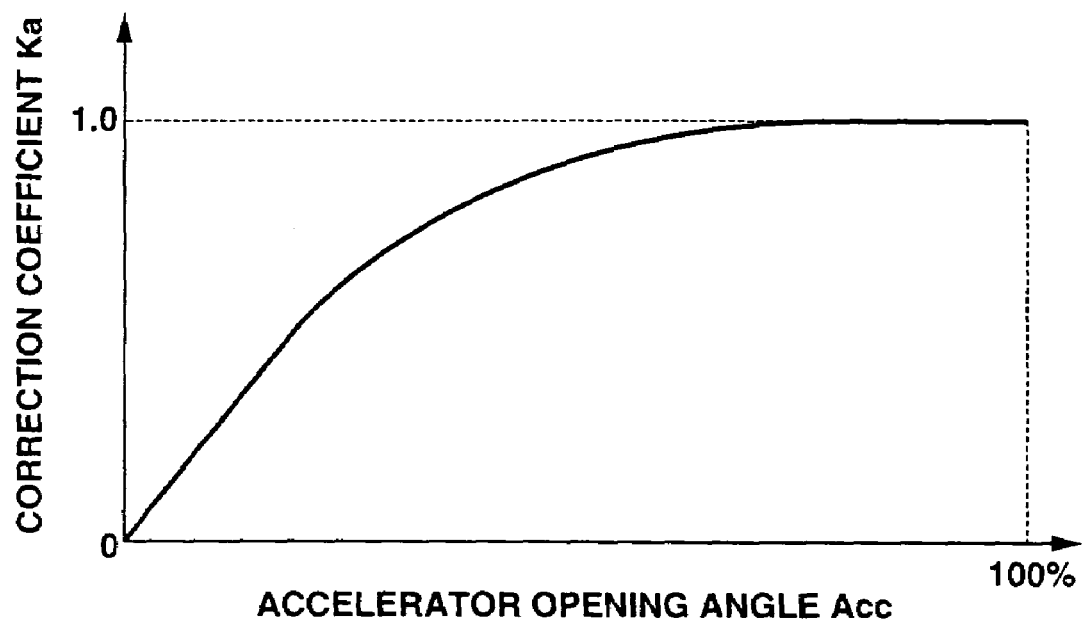
FIG. 4 is a control map view used for calculating a correction coefficient Ka.

Next, At a step S4, controller 5 calculates a correction coefficient Ka which is used for calculating a deceleration-start threshold velocity Vs and a deceleration-start threshold radius Rs that will be described below from accelerator opening angle Acc by referring to a control map in FIG. 4. As shown in FIG. 4, with a horizontal axis of the control map as accelerator opening angle Acc and a vertical axis of the control map as correction coefficient Ka, correction coefficient Ka is set to be increased from 0 to 1 as accelerator opening angle Acc is increased from 0% to 100%.

At the next step S5, controller 5 calculates deceleration-start threshold radius Rs in accordance with the following equation (2) on the basis of turning velocity V and correction coefficient Ka. Decelerating-start threshold radius Rs is a threshold value at which the automatic deceleration is started in accordance with a present turning radius R. In equation (2), $Yg_{L-real}$ denotes an actual limit lateral acceleration within which the stable turning can be achieved (i.e., within which the vehicle can turn with stability) and is predefined according to specifications of the vehicle. $Yg_L$ denotes an imaginary limit lateral acceleration predefined by multiplying the actual limit lateral acceleration by the predetermined value smaller than 1 (for example, 0.9). Hence, a margin is given to $Yg_L$ against the actual limit lateral acceleration.

$$Rs = V^2/\{Yg_L(1-Ka) + Yg_{L-real} Ka\} \qquad (2).$$

According to the above-described equation (2), $Rs = V^2/Yg_L$ when accelerator opening angle Acc is 0% and correction coefficient Ka is 0 and, on the contrary, $Rs = V^2/Yg_{L-real}$ when accelerator opening angle Acc is 100% and correction coefficient Ka is 1. Therefore, deceleration-start threshold radius Rs becomes smaller and becomes nearer (or closer) to the limit of turning performance of the vehicle as accelerator opening angle Acc becomes large. Hence, the automatic deceleration according to turning radius R of the vehicle becomes difficult to be started as accelerator opening angle Acc becomes large.

At the next step S6, controller 5 calculates deceleration-start threshold velocity Vs in accordance with the following equation (3) on the basis of turning radius R and correction coefficient Ka. Decelerating-start threshold velocity Vs is a threshold value which starts the automatic deceleration in accordance with present turning velocity V.

$$Vs = \sqrt{R \cdot \{Y_{gL}(1-Ka) + Y_{gL\text{-}real} \cdot Ka\}} \quad (3).$$

According to the above-described equation (3), $Vs = \sqrt{R \cdot Y_{gL}}$ when accelerator opening angle Acc is 0% and correction coefficient Ka is 0 and, on the contrary, $Vs = \sqrt{R \cdot Y_{gL\text{-}real}}$ when accelerator opening angle Acc is 100% and correction coefficient Ka is 1. Therefore, deceleration-start threshold velocity Vs becomes larger and becomes nearer to the limit of turning performance of the vehicle (i.e., the limit of the stable turning characteristic of the vehicle) as accelerator opening angle Acc becomes large. Hence, the automatic deceleration according to turning velocity V of the vehicle becomes difficult to be started as accelerator opening angle Acc becomes large.

At the next step S7, controller 5 determines whether present turning radius R is smaller than deceleration-start threshold radius Rs and also determines whether present turning velocity V is larger than deceleration-start threshold velocity Vs. If R≧Rs and V≦Vs, controller 5 determines that the turning state of the vehicle has not yet become near to (has not yet approached to) the limit of turning performance of the vehicle and the automatic deceleration is not necessary. Then, the routine returns to the main program. On the other hand, if R<Rs and V>Vs, controller 5 determines that the turning state of the vehicle has become near to the limit of turning performance of the vehicle (i.e., the limit of the stable turning characteristic of the vehicle) and the automatic deceleration is necessary. Then, the routine goes to step S8.

At this step S8, controller 5 calculates a target deceleration Xg* according to a deviation between turning radius R and deceleration-start threshold radius Rs and a deviation between turning velocity V and deceleration-start threshold radius Vs.

At the next step S9, controller 5 calculates a target braking liquid pressure Pi*(i=FL, FR, RL, and RR) for each wheel cylinder 9i, which is required to attain target deceleration Xg*.

At the next step S10, controller 5 controls braking force control unit 6 in such a way that the braking liquid pressure of each wheel cylinder 9i (i=FL, FR, RL, and RR) accords with a corresponding target braking liquid pressure Pi*(i=FL, FR, RL, or RR)

At the next step S11, controller 5 controls engine output control unit 7 to output an optimal engine output for attaining target deceleration Xg* in braking force control unit 6, and the routine returns to a main program.

As described above, the processing of step S2 and step S3 corresponds to a turning state detecting section (means). The processing of step S4 through step S11, braking force control unit 6, and engine output control unit 7 correspond to a turning control section (means). Moreover, accelerator pedal 3 corresponds to an accelerator manipulation section (means) and accelerator sensor 4 corresponds to an accelerator manipulated variable detecting section (means).

Next, advantages of the above-described first embodiment according to the present invention will be described below.

Suppose that the turning is carried out at a certain vehicular velocity. In this supposition, controller 5 can determine that the driver has no acceleration will (i.e., has no request to increase the velocity of the vehicle) in a case where accelerator opening angle Acc which represents a magnitude of the accelerator manipulated variable is 0%. Hence, ordinary deceleration-start threshold radius Rs and ordinary deceleration-start threshold velocity Vs which have predetermined margins against the limit of turning performance (i.e. which are below the limit of turning performance by a predetermined quantity) are set. Then, controller 5 can determine that the stable turning is maintained and there is no need for the automatic deceleration in a case where turning radius R is equal to or larger than deceleration-start threshold radius Rs and turning velocity V is equal to or smaller than deceleration-start threshold velocity Vs (i.e., the determination at step S7 is "No"). Hence, controller 5 controls braking force control unit 6 in such a way that the ordinary braking liquid pressure in accordance with the brake manipulation by the driver is supplied to each wheel-cylinder 9i (i=FL, FR, RL, and RR).

From this state, when turning radius R becomes smaller than deceleration-start threshold radius Rs due to an increase in a magnitude of a steering manipulated variable by the driver, or when turning velocity V becomes larger (or faster) than deceleration-start threshold velocity Vs due to an increase in a magnitude of an accelerator manipulated variable by the driver (i.e., the determination at step S7 is "Yes"), Controller 5 determines that the turning state of the vehicle is approaching to the limit value of turning performance of the vehicle. Therefore, controller 5 determines that the automatic deceleration is needed (i.e., decreasing the velocity of the vehicle automatically is needed). Then, target deceleration Xg* is calculated according to the deviation between turning radius R and deceleration-start threshold radius Rs and a deviation between turning velocity V and deceleration-start threshold radius Vs (at step S8). In order to attain this target deceleration Xg*, the automatic deceleration is performed in such a way that the braking liquid pressure for each wheel cylinder 9i (i=FL, FR, RL, and RR) is increased and the engine output is suppressed (at step S9~S11). Hence, the stable turning is achieved.

In this way, by means of the above-described automatic deceleration (i.e., by decelerating the vehicle automatically), if the turning state returns to the stable state under which the stable turning is enabled, i.e., under which turning radius R is equal to or larger than deceleration-start threshold radius Rs and turning velocity V is equal to or smaller than deceleration-start threshold velocity Vs, the automatic deceleration is suspended.

On the other hand, in a case where accelerator opening angle Acc during the turning is approximately 100%, Controller 5 can determine that the driver has the acceleration request (or will). Therefore, deceleration-start threshold radius Rs and deceleration-start threshold velocity Vs are set as values near to the limit values of turning performance of the vehicle (i.e., are brought close to the limit of turning performance of the vehicle). In other words, deceleration-start threshold radius Rs is made smaller and deceleration-start threshold velocity Vs is made larger. Hence, the automatic deceleration is limited.

Since the automatic deceleration becomes more difficult to be started as accelerator opening angle Acc becomes large, the turning state of the vehicle can become closer to the limit of turning performance of the vehicle. Therefore, an appropriate deceleration control (an appropriate decrease control of the vehicular velocity) in accordance with the acceleration request (or will) by the driver can be achieved.

In the above-described first embodiment according to the present invention, although deceleration-start threshold radius Rs and deceleration-start threshold velocity Vs are calculated from the control map in FIG. 4 and equation (2) and equation (3), a calculation method for deceleration-start threshold radius Rs and deceleration-start threshold velocity Vs is not limited to this control map and equations. Namely, if deceleration-start threshold radius Rs and deceleration-start threshold velocity Vs can be set so that the automatic deceleration becomes difficult to be started as accelerator opening angle Acc becomes large, any kind of control map or equation may be used. Therefore, deceleration-start threshold radius Rs and deceleration-start threshold velocity Vs may start to be varied (or changed) when accelerator opening angle Acc exceeds a predetermined value during the increase of accelerator opening angle Acc. For example, deceleration-start threshold radius Rs and deceleration-start threshold velocity Vs may be varied in a step wise manner in accordance with increase of accelerator opening angle Acc, furthermore, a variation rate of deceleration-start threshold radius Rs may be different from the variation rate of deceleration-start threshold velocity Vs.

Figure 5:
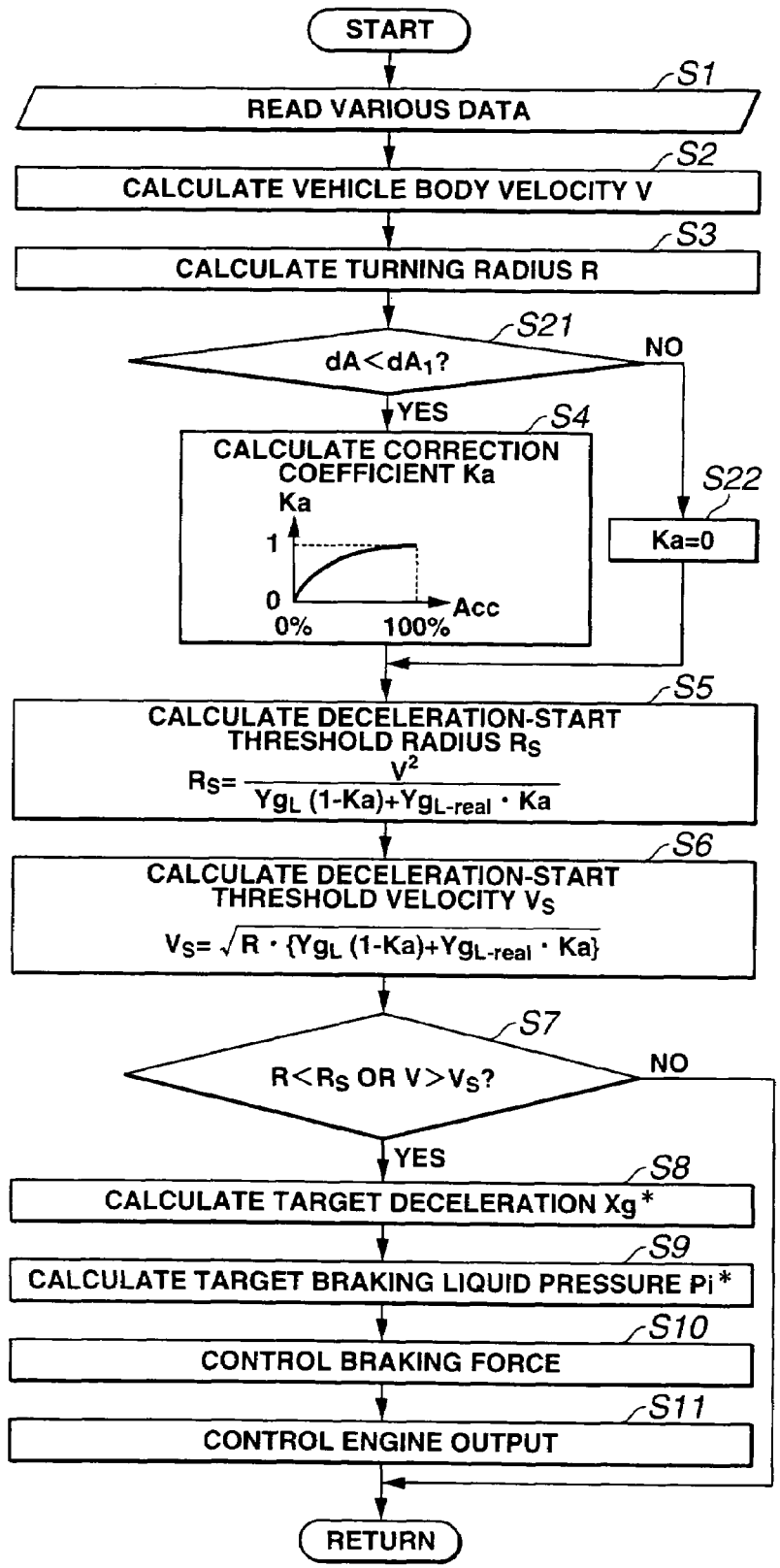
FIG. 5 is an operational flowchart representing the processing of the turning control executed in a second preferred embodiment of the turning control apparatus according to the present invention.

Next, a second preferred embodiment of the turning control apparatus according to the present invention will be described with reference to a flowchart of FIG. 5.

The structure of the second embodiment is generally the same as that described in the first embodiment. However, the limitation on the automatic deceleration is suspended when the driver erroneously manipulates accelerator pedal 3. Namely, in a case of the turning control in the second embodiment, the same processing as the turning control processing in FIG. 3 is performed. However, new steps S21 and S22 are added as shown in FIG. 5. It is noted that the same steps as those shown in FIG. 3 have the same processing contents as those shown in FIG. 5 and the detailed explanation thereof will be omitted herein.

At step S21, to which the routine goes from step S3 described above, controller 5 determines whether an accelerator manipulation speed dA by the driver is less than a predetermined speed $dA_1$. This predetermined speed $dA_1$ is, for example, set to be 0.5% opening angle per millisecond (i.e., 100% per 0.2 seconds). If $dA<dA_1$, controller 5 determines that the accelerator manipulation has been carried out on the basis of the request of the driver and the routine goes to step S4. On the other hand, if $dA \geq dA_1$, controller 5 determines that there is a possibility that the accelerator manipulation has been erroneously carried out by the driver, and the routine goes to step S22, and after correction coefficient Ka is set to be 0 at step S22, the routine goes to step S5. Step S21 and step S22 correspond to a part of the turning control section (means).

Thus, in the above-described second embodiment, if accelerator manipulation speed dA by the driver is equal to or larger (faster) than predetermined value $dA_1$, controller 5 determines that the driver has manipulated accelerator pedal 3 erroneously and sets correction coefficient Ka to be 0. Therefore, deceleration-start threshold radius Rs and deceleration-start threshold velocity Vs are set to be the same values as those set in the case where accelerator opening angle Acc is 0%. In this way, controller 5 suspends the limitation on the automatic deceleration. Thereby, even if accelerator opening angle Acc during the turning becomes as high as approximately 100% by the manipulation mistake of the driver, the automatic deceleration in accordance with the turning state of the vehicle is not limited and the automatic deceleration is started at an ordinary timing. Therefore, an unpleasant feeling is not given to the driver.

The other advantages of this second preferred embodiment are same as those of the first preferred embodiment described above.

Figure 6:
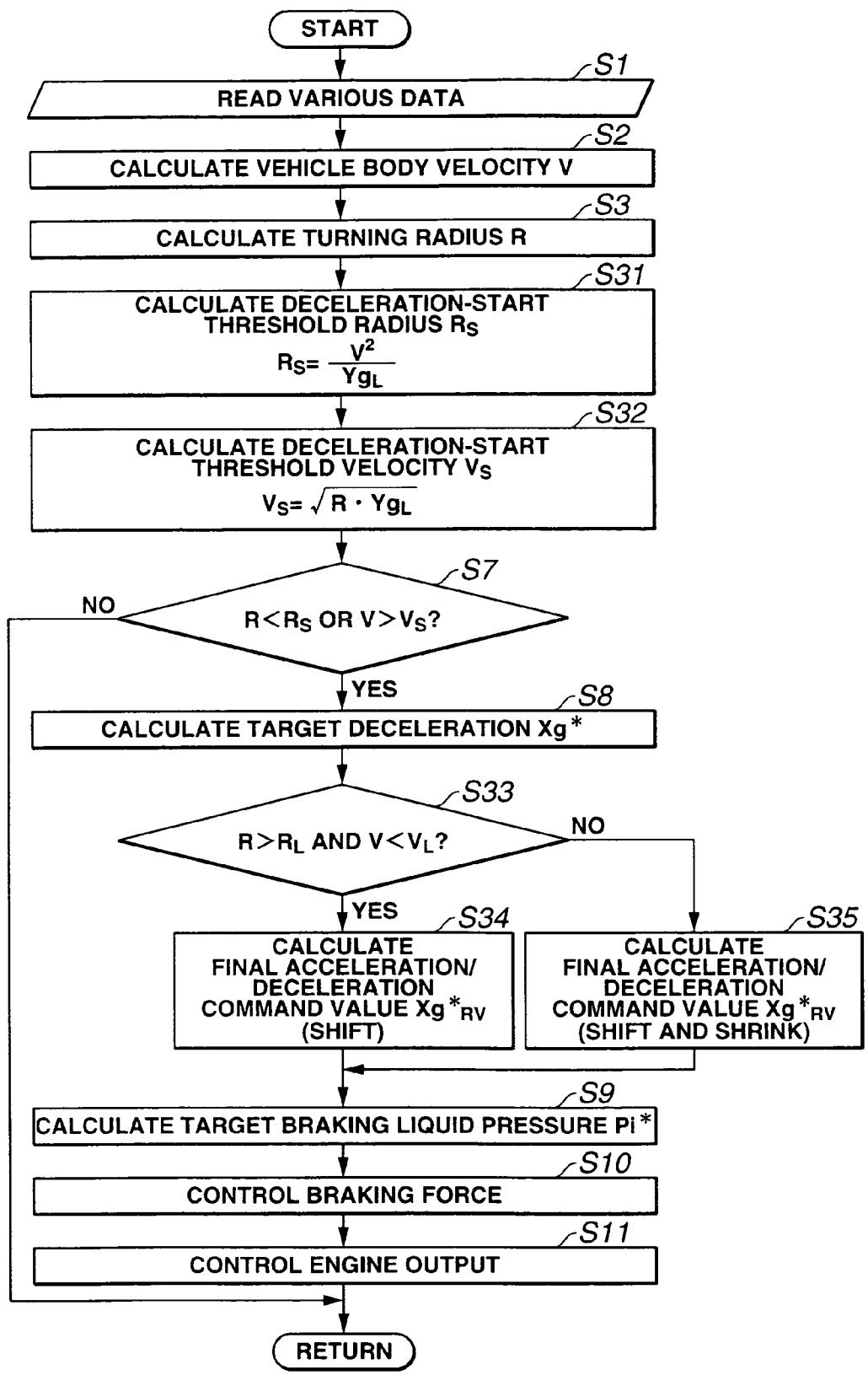
FIG. 6 is an operational flowchart representing the processing of the turning control executed in a third preferred embodiment of the turning control apparatus according to the present invention.
Figure 7:
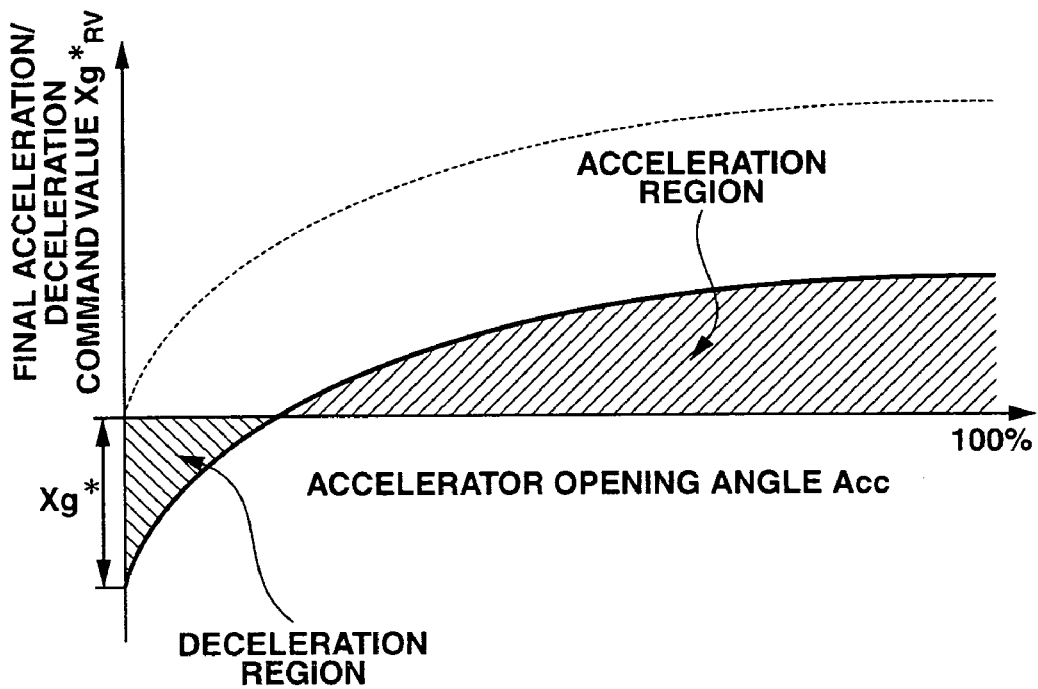
FIG. 7 is an explanatory view for explaining a calculation method of a final acceleration/deceleration command value $Xg^*_{RV}$ in a case where a turning state of the vehicle has a margin for a limit of turning performance.
Figure 8:
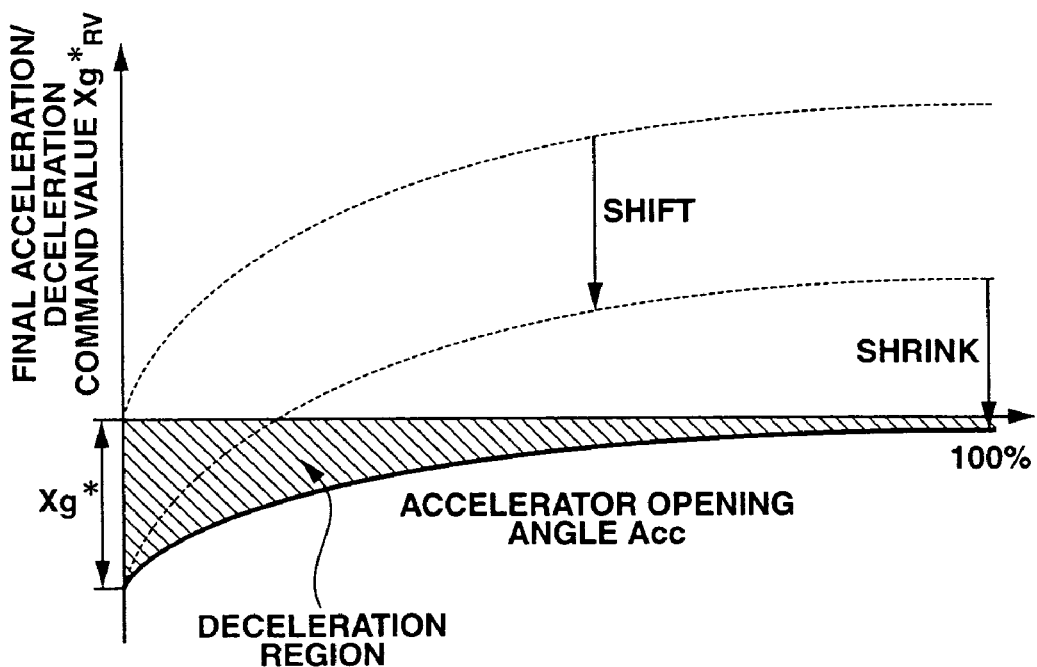
FIG. 8 is an explanatory view for explaining a calculation method of a final acceleration/deceleration command value Xg*$_{RV}$ in a case where a turning state of the vehicle has reached to a limit of turning performance.

Next, a third preferred embodiment according to the present invention will be described with reference to FIG. 6 through FIG. 8.

In this third preferred embodiment, a deceleration of the automatic deceleration is varied (i.e., a decrease rate of the vehicular velocity on the automatic deceleration is varied) in accordance with accelerator opening angle Acc, although deceleration-start threshold radius Rs and deceleration-start threshold velocity Vs are varied in accordance with accelerator opening angle Acc in the first preferred embodiment. Namely, in a processing of the turning control of the third preferred embodiment, the same turning control processing as the processing in FIG. 3 is executed. However, step S4 of FIG. 3 is deleted and steps S5 and S6 of FIG. 3 are changed to new steps 531 and 532 and new steps 533 through 535 is added between step S8 and S9 as shown in FIG. 6. It is noted that the same steps as those shown in FIG. 3 have the same processing contents as those shown in FIG. 6 and the detailed explanation thereof will be omitted herein.

At a step S31, controller 5 calculates deceleration-start threshold radius Rs which is the threshold value for starting the automatic deceleration in accordance with present turning radius R, in accordance with the following equation (4). $Yg_L$ denotes the above-described imaginary limit lateral acceleration.

$$Rs = V^2 / Yg_L \qquad (4).$$

Next, at a step S32, controller 5 calculates deceleration-start threshold velocity Vs which is the threshold value for starting the automatic deceleration in accordance with present turning velocity V in accordance with the following equation (5).

$$Vs = \sqrt{(R \cdot Yg_L)} \qquad (5).$$

At a step S33, controller 5 determines whether present turning radius R is larger than an actual limit turning radius $R_L = V^2/Yg_{L\text{-}real}$ and also determines whether present turning velocity V is smaller than an actual limit turning velocity $V_L = \sqrt{(R \cdot Yg_{L\text{-}real})}$. $Yg_{L\text{-}real}$ denotes the above-described actual marginal lateral acceleration. If $R > R_L$ and $V < V_L$, controller 5 determines that the turning state of the vehicle has not reached to the limit of turning performance of the vehicle, and the routine goes to step S34.

At a step S34, controller 5 calculates a final acceleration/deceleration command value $Xg^*_{RV}$ on the basis of accelerator opening angle Acc and target deceleration $Xg^*$. Specifically, as shown in FIG. 7, controller 5 calculates final acceleration/deceleration command value $Xg^*_{RV}$ (solid line in FIG. 7) by shifting a ordinary acceleration command value (dot line in FIG. 7) which is varied with reference to accelerator opening angle Acc to the deceleration (or negative) side by a quantity of target deceleration $Xg^*$. Therefore, final acceleration/deceleration command value $Xg^*_{RV}$ is varied from a negative value to a positive value increasing to the acceleration (positive) side as accelerator opening angle Acc increases from 0%. Hence, the deceleration of the vehicle (or, the decrease rate of the vehicular velocity) becomes smaller as accelerator opening angle Acc becomes larger.

On the other hand, if $R \leq R_L$ or $V \geq V_L$ at step S33, controller 5 determines that the turning state of the vehicle has reached to the limit of turning performance of the vehicle and the routine goes to step S35.

At a step S35, controller 5 calculates final acceleration/deceleration command value $Xg^*_{RV}$ on the basis of accelerator opening angle Acc and target deceleration $Xg^*$. Specifically, as shown in FIG. 8, the ordinary acceleration command value (dot line in an upper part of FIG. 8) (which is varied with accelerator opening angle Acc) is shifted to the deceleration (or negative) side by the quantity of target deceleration $Xg^*$. Moreover, this shifted line (dot line in a lower part of FIG. 8) is shrunk (or reduced) to the deceleration (or negative) side so that final acceleration/deceleration command value $XG^*_{RV}$ is equal to or below 0 when accelerator opening angle Acc is 100%. In this way, final acceleration/deceleration command value $Xg^*_{RV}$ (solid line in FIG. 8) is calculated. Therefore final acceleration/deceleration command value $Xg^*_{RV}$ cannot become a positive value even if accelerator opening angle Acc is increased to near 100%. Hence, a driving force of the vehicle is suppressed irrespective of accelerator opening angle Acc. After controller 5 calculates final acceleration/deceleration command value $Xg^*_{RV}$ at steps S34 and S35, the routine goes to step S9 and controller 5 calculates each target braking liquid pressure Pi* required for corresponding wheel cylinder 9i in order to attain final acceleration/deceleration command value $Xg^*_{RV}$. Step S31 through step S35 correspond to part of the turning control section (means).

Next, the advantages of the above-described third preferred embodiment according to the present invention will be described below.

Suppose that present turning radius R is smaller than deceleration-start threshold radius Rs or present turning velocity V is larger than deceleration-start threshold velocity Vs (i.e., the determination at step S7 is "Yes"). Therefore, controller 5 has determined that the automatic deceleration is needed. At this time, in a case where turning radius R is larger than actual limit turning radius $R_L$ and turning velocity V is smaller than actual limit turning velocity $V_L$ (i.e., the determination at step S33 is "Yes"), the turning state of the vehicle has not reached to the limit of turning performance of the vehicle. Therefore, the limitation on the above-described automatic deceleration is placed (at step S34) by increasing final acceleration/deceleration command value $Xg^*_{RV}$ from a negative value to a positive value as accelerator opening angle Acc increases. Thereby, the deceleration variable of the automatic deceleration is decreased as accelerator opening angle Acc is increased. The turning state of the vehicle can become closer to the limit of turning performance. Hence, an appropriate deceleration control in accordance with the acceleration request by the driver can be achieved.

In addition, a start timing of the automatic deceleration is stable since deceleration-start threshold radius Rs and deceleration-start threshold velocity Vs are not varied in accordance with accelerator opening angle Acc. Therefore, the unpleasant feeling is not given to the driver. From this state, if turning radius R becomes equal to or smaller than actual limit turning radius RL or turning velocity V becomes equal to or larger than actual limit turning velocity $V_L$ (i.e., the determination at step S33 is "No"), controller 5 determines that the turning state of the vehicle has reached to the limit of turning performance of the vehicle. In this case, final acceleration/deceleration command value $Xg^*_{RV}$ is suppressed to be equal to or below 0 (at step S35) even if accelerator opening angle Acc is 100%. Therefore, a worsening of the turning state of the vehicle can be prevented since a generation of the driving force of the vehicle is suppressed.

In the above-described third preferred embodiment according to the present invention, the shifted acceleration command value (in FIG. 8) is shrunk to the deceleration (or negative) side, only in the case where the turning state of the vehicle has reached to the limit of turning performance. However, the shifted acceleration command value (in FIG. 8) may be shrunk to the deceleration (or negative) side gradually as the turning state of the vehicle become nearer to the limit of turning performance, even in the case where the turning state of the vehicle has not reached to the limit of turning performance (i.e., even when the routine is at step S34). Thereby, final acceleration/deceleration command value $Xg^*_{RV}$ can be changed smoothly (or continuously) when the result of determination of step S33 is changed. Hence, the unpleasant feeling is not given to the driver.

As described above in the first preferred embodiment through third preferred embodiment, as the method (or means) of placing the limitation on the automatic deceleration of the vehicle, there are two methods (or means). The first is a method of varying deceleration-start threshold radius Rs and deceleration-start threshold velocity Vs. The second is a method (or means) of varying the rate of the automatic deceleration. However, of course, either of these two methods may suitably be selected according to predetermined conditions, or these two methods may also be combined. Moreover, in the third preferred embodiment, placing the limitation on the automatic deceleration may be suspended as the second preferred embodiment in the case where the driver erroneously manipulates accelerator pedal 3.

This application is based on a prior Japanese Patent Application No. 2003-384194 filed on Nov. 13, 2003. The entire contents of this Japanese Patent Applications No. 2003-384194 is hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A turning control apparatus for an automotive vehicle, comprising:
    a turning control section configured to controllably decelerate the vehicle in accordance with a turning state of the vehicle when the turning state of the vehicle exceeds a deceleration-start threshold value which has a margin against a limit of a turning performance of the vehicle; and
    an accelerator manipulated variable detecting section configured to detect an accelerator manipulated variable,
    wherein the turning control section is configured to place a limitation on said controllable deceleration of the vehicle to bring the turning state of the vehicle closer to the limit of the turning performance by decreasing a control quantity of said deceleration control as a magnitude of the detected accelerator manipulated variable becomes larger, wherein the turning state of the vehicle remains below the limit of the turning performance from a time at which the turning state exceeds the deceleration-start threshold value,
    wherein the turning control section places the limitation on said controllable deceleration of the vehicle by varying a deceleration of the vehicle in accordance with the magnitude of the accelerator manipulated variable detected by the accelerator manipulated variable detecting section.

2. A turning control apparatus as claimed in claim 1, wherein the turning control section places the limitation on said controllable deceleration of the vehicle by varying the deceleration-start threshold value in accordance with the magnitude of the accelerator manipulated variable detected by the accelerator manipulated variable detecting section.

3. A turning control apparatus as claimed in claim 1, wherein the turning control section places the limitation on said controllable deceleration of the vehicle by bringing the deceleration-start threshold value closer to the limit value of turning performance of the vehicle in accordance with the magnitude of the accelerator manipulated variable detected by the accelerator manipulated variable detecting section.

4. A turning control apparatus as claimed in claim 2, wherein the deceleration-start threshold value is calculated on the basis of a correction coefficient which is increased from 0 to 1 as the magnitude of the accelerator manipulated variable detected by the accelerator manipulated variable detecting section becomes larger.

5. A turning control apparatus as claimed in claim 2, wherein the deceleration-start threshold value is at least one of a deceleration-start threshold radius which is the deceleration-start threshold value for a turning radius and a deceleration-start threshold velocity which is the deceleration-start threshold value for a turning velocity of the vehicle.

6. A turning control apparatus as claimed in claim 5, wherein the turning control section is configured to controllably decelerate the vehicle by using both of the deceleration-start threshold radius and the deceleration-start threshold velocity.

7. A turning control apparatus as claimed in claim 1, wherein the turning control section places the limitation on said controllable deceleration of the vehicle by decreasing a deceleration of the vehicle in accordance with the magnitude of the accelerator manipulated variable detected by the accelerator manipulated variable detecting section.

8. A turning control apparatus as claimed in claim 1, wherein the turning control section places the limitation on said controllable deceleration of the vehicle in such a manner that the turning state of the vehicle approaches more to the limit of turning performance of the vehicle as the magnitude of the accelerator manipulated variable detected by the accelerator manipulated variable detecting section becomes larger.

9. A turning control apparatus as claimed in claim 1, wherein the turning control section places the limitation on said controllable deceleration of the vehicle in such a manner that the deceleration-start threshold value becomes nearer to the limit value of turning performance of the vehicle as the magnitude of the accelerator manipulated variable detected by the accelerator manipulated variable detecting section becomes larger.

10. A turning control apparatus as claimed in claim 1, wherein the turning control section places the limitation on said controllable deceleration of the vehicle in such a manner that a deceleration of the vehicle is decreased more as the magnitude of the accelerator manipulated variable detected by the accelerator manipulated variable detecting section becomes larger.

11. A turning control apparatus as claimed in claim 1, wherein the turning control section places the limitation on said controllable deceleration of the vehicle in such a manner that a deceleration of the vehicle is decreased more to become an acceleration as the magnitude of the accelerator manipulated variable detected by the accelerator manipulated variable detecting section becomes larger.

12. A turning control apparatus as claimed in claim 1, wherein the turning control section suspends the limitation on said controllable deceleration of the vehicle when an accelerator of the vehicle is manipulated erroneously.

13. A turning control apparatus as claimed in claim 1, wherein the turning control section suspends the limitation on said controllable deceleration of the vehicle when a driver's accelerator manipulation speed detected by the accelerator manipulated variable detecting section is larger than a predetermined speed.

14. A turning control apparatus as claimed in claim 4, wherein the correction coefficient is 0 when a driver's accelerator manipulation speed detected by the accelerator manipulated variable detecting section is larger than a predetermined speed.

15. A turning control apparatus as claimed in claim 1, wherein the turning control section suspends the limitation on said controllable deceleration of the vehicle irrespective of the magnitude of the accelerator manipulated variable detected by the accelerator manipulated variable detecting section in the case where the turning state of the vehicle has reached the limit of turning performance of the vehicle.

16. A turning control apparatus as claimed in claim 1, wherein the turning control section suppresses a driving force of the vehicle irrespective of the magnitude of the accelerator manipulated variable detected by the accelerator manipulated variable detecting section in the case where the turning state of the vehicle has reached the limit of turning performance of the vehicle.

17. A turning control method for an automotive vehicle, comprising:

decelerating the vehicle controllably in accordance with a turning state of the vehicle when the turning state of the vehicle exceeds a deceleration-start threshold value which has a margin against a limit of a turning performance of the vehicle;

detecting an accelerator manipulated variable; and placing a limitation on said controllable deceleration of the vehicle to bring the turning state of the vehicle closer to the limit of the turning performance, by decreasing a control quantity of said deceleration control as a magnitude of the detected accelerator manipulated variable becomes larger, wherein the turning state of the vehicle remains below the limit of the turning performance from a time at which the turning state exceeds the deceleration-start threshold value;

wherein the limitation on said controllable deceleration of the vehicle is placed by varying a deceleration of the vehicle in accordance with the magnitude of the detected accelerator manipulated variable.

18. A turning control apparatus for an automotive vehicle, comprising:

turning control means for decelerating the vehicle controllably in accordance with a turning state of the vehicle when the turning state of the vehicle exceeds a deceleration-start threshold value which has a margin against a limit of a turning performance of the vehicle; and accelerator manipulated variable detecting means for detecting an accelerator manipulated variable, wherein the turning control means is configured to place a limitation on said controllable deceleration of the vehicle to bring the turning state of the vehicle closer to the limit of the turning performance, by decreasing a control quantity of said deceleration control as a magnitude of the detected accelerator manipulated variable becomes larger, wherein the turning state of the vehicle remains below the limit of the turning performance from a time at which the turning state exceeds the deceleration-start threshold value, wherein the turning control means places the limitation on said controllable deceleration of the vehicle by varying a deceleration of the vehicle in accordance with the magnitude of the accelerator manipulated variable detected by the accelerator manipulated variable detecting means.

* * * * *